(12) United States Patent
Ham (10) Patent No.: US 8,045,110 B2
(45) Date of Patent: Oct. 25, 2011

(54) METHOD FOR FABRICATING A LIQUID CRYSTAL DISPLAY DEVICE INCLUDING IRRADIATING FIRST AND SECOND ION BEAMS ONTO INCLINED AND FLAT SURFACES OF THE TFT SUBSTRATE

(75) Inventor: Yong Sung Ham, Anyang-si (KR)

(73) Assignee: LG Display Co., Ltd., Seoul (KR)

( * ) Notice: Subject to any disclaimer, the term of this patent is extended or adjusted under 35 U.S.C. 154(b) by 460 days.

(21) Appl. No.: 11/246,124

(22) Filed: Oct. 11, 2005

(65) Prior Publication Data

US 2006/0077327 A1    Apr. 13, 2006

(30) Foreign Application Priority Data

Oct. 12, 2004   (KR) .................. 10-2004-0081270

(51) Int. Cl.
*G02F 1/1337* (2006.01)
*G02F 1/1343* (2006.01)

(52) U.S. Cl. ........ 349/124; 349/123; 349/128; 349/129; 349/141

(58) Field of Classification Search .................. 349/141, 349/123–124, 128–129
See application file for complete search history.

(56) References Cited

U.S. PATENT DOCUMENTS

| | | | |
|---|---|---|---|
| 6,124,914 A * | 9/2000 | Chaudhari et al. | 349/129 |
| 6,292,244 B1 * | 9/2001 | Kuo et al. | 349/129 |
| 7,105,845 B2 * | 9/2006 | Kumar et al. | 250/492.3 |
| 2001/0007490 A1 * | 7/2001 | Ohta et al. | 349/141 |
| 2002/0033922 A1 * | 3/2002 | Hidehira et al. | 349/141 |

FOREIGN PATENT DOCUMENTS

| | | |
|---|---|---|
| JP | 09-244027 | 9/1997 |
| JP | 11-305256 | 11/1999 |
| JP | 2003-222873 | 8/2003 |

* cited by examiner

*Primary Examiner* — Lauren Nguyen
(74) *Attorney, Agent, or Firm* — McKenna Long & Aldridge, LLP (57) ABSTRACT

Provided are an LCD capable of improving an image quality and an aperture ratio by uniform alignment of liquid crystal, and a method for fabricating the LCD. A first ion beam is irradiated onto an alignment layer formed on a substrate in a first direction, and a second ion beam is irradiated onto the alignment layer in a second direction that is symmetrical or asymmetrical to the first direction with respect to a line perpendicular to the substrate. Accordingly, the entire surface of the alignment layer can be uniformly aligned. Consequently, light leakage can be prevented and thus an image quality can be enhanced. Also, a black matrix margin can be reduced and an aperture ratio can be enhanced.

40 Claims, 10 Drawing Sheets

METHOD FOR FABRICATING A LIQUID CRYSTAL DISPLAY DEVICE INCLUDING IRRADIATING FIRST AND SECOND ION BEAMS ONTO INCLINED AND FLAT SURFACES OF THE TFT SUBSTRATE

This application claims the benefit of Korean Patent Application No. 2004-81270, filed on Oct. 12, 2004, which is hereby incorporated by reference for all purposes as if fully set forth herein.

BACKGROUND OF THE INVENTION

1. Field of the Invention

The present invention relates to a liquid crystal display device, and more particularly, to a liquid crystal display device capable of improving image quality and aperture ratio, and a method for fabricating the same.

2. Discussion of the Related Art

Among the image display devices for displaying image data on their screens, a cathode ray tube (CRT) has been most widely used. However, the CRT is heavy and bulky relative to its display area. Thus, the use of the CRT is very inconvenient.

With the recent development of electronic industries, the display devices that have been restrictively used in TV screens are now used in personal computers, notebook computers, mobile terminals, dash boards, electronic display boards, and so on. In addition, with the development of information communication technologies, large capacity of image information can be transmitted. Therefore, next-generation flat panel display devices capable of processing and representing the large capacity of image information become increasingly important.

The next-generation flat panel display devices have to be lightweight and have a low cost slim profile, high brightness, large screen, and low power consumption. Among them, a liquid crystal display device (LCD) is in the spotlight.

The LCD has better resolution than other any flat panel display device. In displaying the moving pictures, the LCD has a rapid response time, which is comparable to that of the CRT.

As is well known, the LCD is driven using an optical anisotropy and polarization of liquid crystal.

Since the liquid crystal has a thin and long structure, it has directionality in a molecular arrangement. The direction of the molecular arrangement can be controlled by applying electric field to the liquid crystal.

Accordingly, if the direction of the molecular arrangement is arbitrarily controlled, the molecular arrangement changes and thus light polarized by the optical anisotropy is arbitrarily modulated. In this manner, the image information is displayed.

An active matrix LCD (AM LCD) has high resolution and good reproducibility of moving images. In the AM LCD, thin film transistors (TFTs) and pixel electrodes connected thereto are arranged in a matrix form.

A description of a process of forming an alignment layer that determines an initial arrangement direction of the liquid crystal molecule in the AM LCD follows.

First, a polymer thin film is coated and an alignment layer is arranged in a constant direction.

The alignment layer is generally formed of a polyimide-based organic material, and a rubbing method is widely used to arrange the alignment layer.

In the rubbing method, a polyimide-based organic material is coated on a substrate and is arranged after removing a solvent at 60-80° C. Then, the polyimide-based organic material is hardened at 80-200° C. to thereby form a polyimide alignment layer. The alignment layer is rubbed using a rubbing cloth around which velvet is wound. In this manner, various alignment directions are formed.

Since the rubbing method is convenient to the alignment process, it is suitable for mass production and can provide a stable alignment.

However, since the rubbing method is performed through the direct contact between the rubbing cloth and the alignment layer, cells may be contaminated by particles, and the TFTs on the substrate may be damaged. Also, after the rubbing, an additional cleaning process is required, and non-uniformity of the alignment may occur in the application to large-sized LCDs. Consequently, the yield of the LCDs is degraded.

To solve these problems of the rubbing method, non-rubbing techniques that do not use the mechanical rubbing method have been proposed.

Examples of the non-rubbing techniques include a method using Langmuir-Blodgett film (LB film), an optical alignment method using UV irradiation, a method using oblique deposition of $SiO_2$, a method using micro-groove formed by photolithography, and a method using ion beam irradiation.

The method using the ion beam can solve the problems of the mechanical rubbing method and can use the existing alignment material as it is. Thus, this method can be suitably used in the large-sized LCD.

Figure 1:
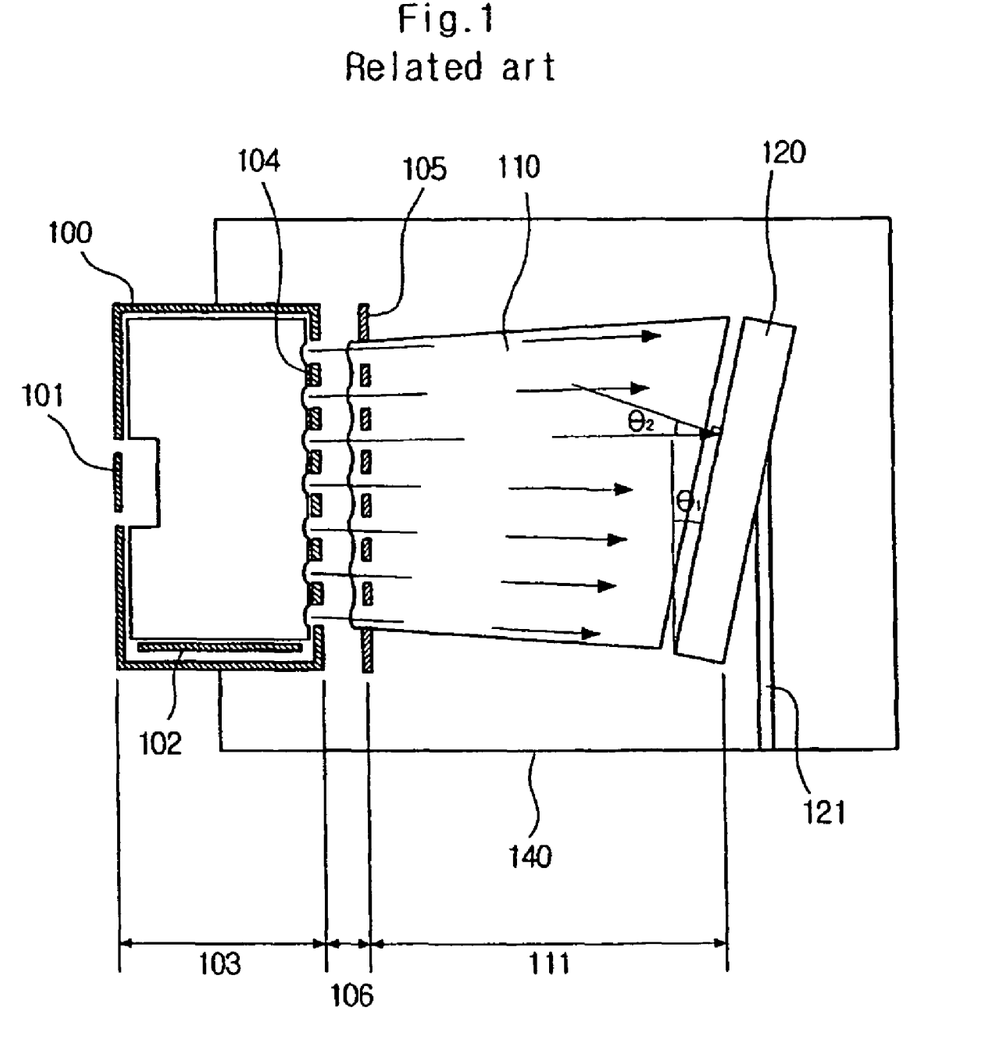
FIG. 1 is a schematic view of an ion beam irradiation apparatus used to form a related art alignment layer.

FIG. 1 is a schematic view of an ion beam irradiation apparatus used to form a related art alignment layer.

Referring to FIG. 1, the ion beam irradiation apparatus is divided into three regions, that is, a first region 103 in which injected gas is ionized into ions and electrons to thereby form plasma, a second region 106 through which the ions are accelerated in a beam, and a third region 111 in which the accelerated ion beam 110 is emitted and reaches a substrate 120.

The injected gas is ionized into ions in the region 103 in which the plasma is formed, and the ions are accelerated and irradiated onto the substrate 120.

That is, the ion beam irradiation apparatus includes an ion beam source 100, a vacuum vessel 140, and a holder 121. The ion beam source 100 has a cathode 101, an anode 102, and an ion beam emitting medium 104, and an ion beam accelerating medium 105. The vacuum vessel 140 allows the ion beam 110 generated from the ion beam source 100 to irradiate without significant deviation to the substrate 120. Also, the holder 121 fixes the substrate 120 at a constant angle within the vacuum vessel.

Although not shown, a shutter can be provided between the ion beam source 100 and the substrate 120 to control an irradiation time of the ion beam 110 with respect to the substrate 120.

The ion beam source 100 generates the ions and the ion beams. Due to the voltage difference between the cathode 101 and the anode 102, the injected gas is ionized to thereby generate the plasma containing the electrons and the ions. The ions contained in the plasma pass through the ion beam emitting medium 104 to thereby emit the ion beam 110.

The ion beam emitted from the discharged plasma is accelerated by the action of the electric field applied to the ion beam accelerating beam 105. Thus, the ion beam is irradiated onto the substrate 120 at a constant angle.

At this time, the substrate 120 is inclined at a predetermined angle with respect to the irradiated ion beam 110. Therefore, using the ion beam 110, a desired alignment direction can be formed on the alignment layer coated on the substrate 120, and a pretilt angle can be formed.

Like this, the ion beam 110 from the ion beam source 100 is emitted in a direction normal to the ion beam source 100, and the pretilt angle of the liquid crystal molecule is determined by an irradiation angle $\theta_2$ with respect to the alignment layer of the substrate 120 inclined at a predetermined angle $\theta_1$. Here, $\theta_1=\theta_2$.

The irradiation angle $\theta_2$ represents an angle between an irradiation direction of the ion beam 110 and the normal direction of the substrate 120. The relationship between the irradiation angle $\theta_2$ and the pretilt angle is shown in FIG. 2.

Figure 2:
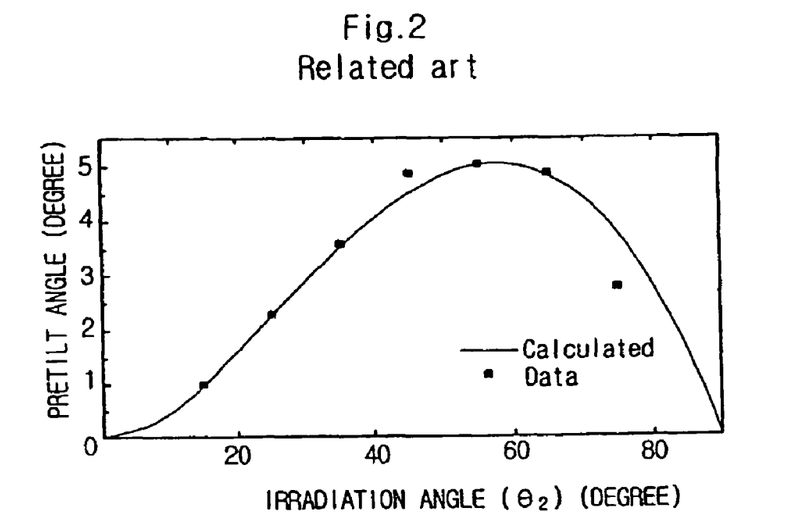
FIG. 2 a graph illustrating the relationship between an ion beam irradiation angle $\theta_2$ and a pretilt angle illustrated in FIG. 1.

Referring to FIG. 2, the pretilt angle has different characteristic depending on the irradiation angle of the ion beam. The liquid crystal molecule has the maximum pretilt angle of 5° when the irradiation angle of the ion beam is in the range of 40-60°, and has the pretilt angle of below 5° when the irradiation angle is in the range out of 40-60°.

Therefore, in order to obtain the desired pretilt angle in the LCD, the ion beam with the appropriate irradiation angle must be irradiated with the same energy on the entire surface of the alignment layer of the substrate.

The pretilt angle, however, has the different characteristic depending on the irradiation angle of the ion beam, as shown in FIG. 2. Therefore, the uniform ion beam energy must be irradiated to obtain the desired pretilt angle.

To irradiate the uniform ion beam energy, the distance between the position from which the ion beam is emitted and the substrate must be sufficiently long. As the size of the substrate becomes larger, its length must be longer. Consequently, the size of the apparatus increases exponentially.

A twisted nematic (TN) LCD is widely used. In the TN LCD, electrodes are formed on two substrates, respectively. A liquid crystal director is arranged to be twisted at 90°. Then, the liquid crystal director is driven by applying a predetermined voltage electrodes.

However, the TN LCD has the greatest problem of a narrow viewing angle.

To solve the problem of the narrow viewing angle, new LCDs have been developed. Examples of the new LCDs are an in-plane switching (IPS) LCD and an optically compensated birefringence (OCB) LCDs.

In the IPS LCD, a common electrode and a pixel electrode are formed together in a pixel region of the same substrate to drive liquid crystal molecules in a state in which the liquid crystal molecules are maintained horizontally with respect to the substrate. By applying a predetermined voltage between the common electrode and the pixel electrode, an electric field is generated in a direction horizontal to the substrate. That is, a major axis of the liquid crystal molecule lies down instead of standing up.

For this reason, a variation in the birefingence of the liquid crystal with respect to the viewing direction is small, and thus the viewing angle of the IPS LCD is better than that of the TN LCD.

In the IPS LCD, however, a step is caused by the common and pixel electrodes and gate and data lines. Accordingly, when the ion beam is irradiated to arrange the alignment layer in a constant direction, the irradiated ion beam does not reach certain regions adjacent to the step, so that certain regions are not aligned.

The ion beam is inclined at a predetermined angle with respect to the substrate. Therefore, in the step region such as the common and pixel electrodes and the conductive lines, the ion beam is not irradiated to a side of the step and its adjacent region disposed opposite to the irradiation direction of the ion beam.

Meanwhile, the problem that the alignment characteristic is degraded in the step region also occurs in the TN LCD, the vertical alignment (VA) LCD, and the OCB LCD.

Figure 3:
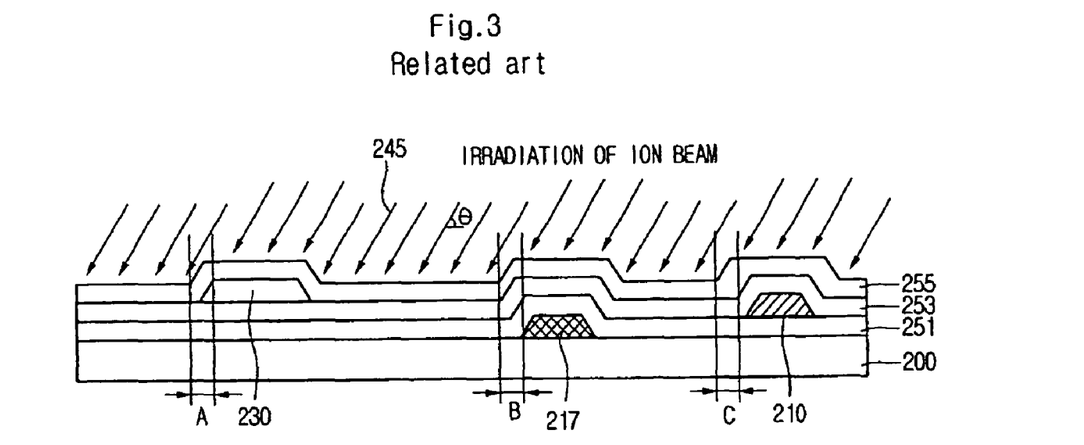
FIG. 3 is a partial sectional view illustrating a process of irradiating an ion beam onto an alignment layer formed on a common electrode and a pixel electrode in a related art IPS LCD.

FIG. 3 is a partial sectional view illustrating a process of irradiating an ion beam onto an alignment layer formed on a common electrode and a pixel electrode in a related art IPS LCD.

Referring to FIG. 3, a common electrode 217 is formed on a substrate 200, and a gate insulating layer 251 and a passivation layer 253 are formed on the common electrode 217.

A data line 210 is formed between the gate insulating layer 251 and the passivation layer 253.

Although not shown in FIG. 3, a gate line is formed on the substrate 200. The gate line and the data line 210 cross each other to define a pixel region.

A pixel electrode 230 is formed on the passivation layer 253. The pixel electrode 230 is not overlapped with the common electrode 217. An alignment layer 255 is formed on the passivation layer 253 and the pixel electrode 230.

In the alignment process of the alignment layer 255 using the ion beam 245, a step difference is formed by the common electrode 217, the pixel electrode 230, the data line 210, and the gate line (not shown). Therefore, due to the taper angle of the step difference, the ion beam 245 irradiated at a specific angle does not reach regions A, B and C.

As illustrated in FIG. 3, when the ion beam 245 is irradiated at an angle $\theta$ with respect to the substrate 200, the ion beam does not reach the regions A, B and C due to the step difference between the electrode and the line. The alignment is not achieved in these regions A, B and C, and thus the liquid crystal is not arranged. Consequently, light leakage occurs in the pixel region, resulting in the degradation of the contrast ratio.

Also, light leakage occurs in the region in which the liquid crystal is not uniformly arranged because of the step difference of the conductive lines. A width of a black matrix increases to prevent the light leakage, and therefore an aperture ratio is degraded.

SUMMARY OF THE INVENTION

Accordingly, the present invention is directed to an LCD and a method for fabricating the same that substantially obviate one or more problems due to limitations and disadvantages of the related art.

An advantage of the present invention is to provide an LCD capable of improving an image quality by uniform alignment of liquid crystal, and a method for fabricating the same.

Another advantage of the present invention is to provide an LCD capable of preventing light leakage and thus improving an aperture ratio by uniform alignment of liquid crystal, and a method for fabricating the same.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided an LCD including: a first substrate; an alignment layer on the first substrate, the alignment layer being aligned by irradiating ion beams onto the first substrate in first and second directions; a second substrate facing the first substrate; and a liquid crystal layer interposed between the first and second substrates.

In another aspect of the present invention, there is provided a method for fabricating an LCD including first and second substrates and a liquid crystal layer interposed between the first and second substrates, the method including: forming an alignment layer on the first substrate; performing a first alignment process on the alignment layer by irradiating a first ion beam onto the alignment layer in a first direction inclined at a first predetermined angle to the first substrate; and performing a second alignment process on the alignment layer by irradiating a second ion beam onto the alignment layer in a second direction inclined at a second predetermined angle to the first substrate.

In a further another aspect of the present invention, there is provided a method for fabricating an LCD including first and second substrates and a liquid crystal layer interposed between the first and second substrates, the method including: forming an alignment layer on the first substrate; performing a first alignment process on the alignment layer by irradiating a first ion beam onto the alignment layer in a first direction inclined at a first predetermined angle to the first substrate; disposing a mask including a blocking portion and a transmitting portion over the first substrate; and performing a second alignment process on the alignment layer by irradiating a second ion beam onto the alignment layer in a second direction inclined at a second predetermined angle to the first substrate.

In a still further another aspect of the present invention, there is provided a method for fabricating an LCD, forming an alignment layer on the first substrate; disposing a mask including a blocking portion and a transmitting portion over the first substrate; performing a first alignment process on the alignment layer by irradiating a first ion beam onto the alignment layer in a first direction inclined at a first predetermined angle to the first substrate; removing the mask; and performing a second alignment process on the alignment layer by irradiating a second ion beam onto the alignment layer in a second direction inclined at a second predetermined angle to the first substrate.

An ion beam penetrating the transmitting portion may correspond to a stepped portion on the first substrate.

Accordingly, the entire surface of the alignment layer can be uniformly aligned, and thus light leakage can be prevented. Consequently, the image quality and the aperture ratio of the LCD can be enhanced.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

In the drawings.

DETAILED DESCRIPTION OF THE ILLUSTRATED EMBODIMENTS

Reference will now be made in detail to the embodiments of the present invention, examples of which are illustrated in the accompanying drawings. Wherever possible, the same reference numbers will be used throughout the drawings to refer to the same or like parts.

The present invention can be applied not only to IPS LCDs, but also to various-mode LCDs, such as a TN LCD, a VA LCD, an OCB LCD, and an electrically controlled birefringence (ECB) LCD, etc. That is, it should be noted that the present invention is not limited to the IPS LCD.

Figure 4:
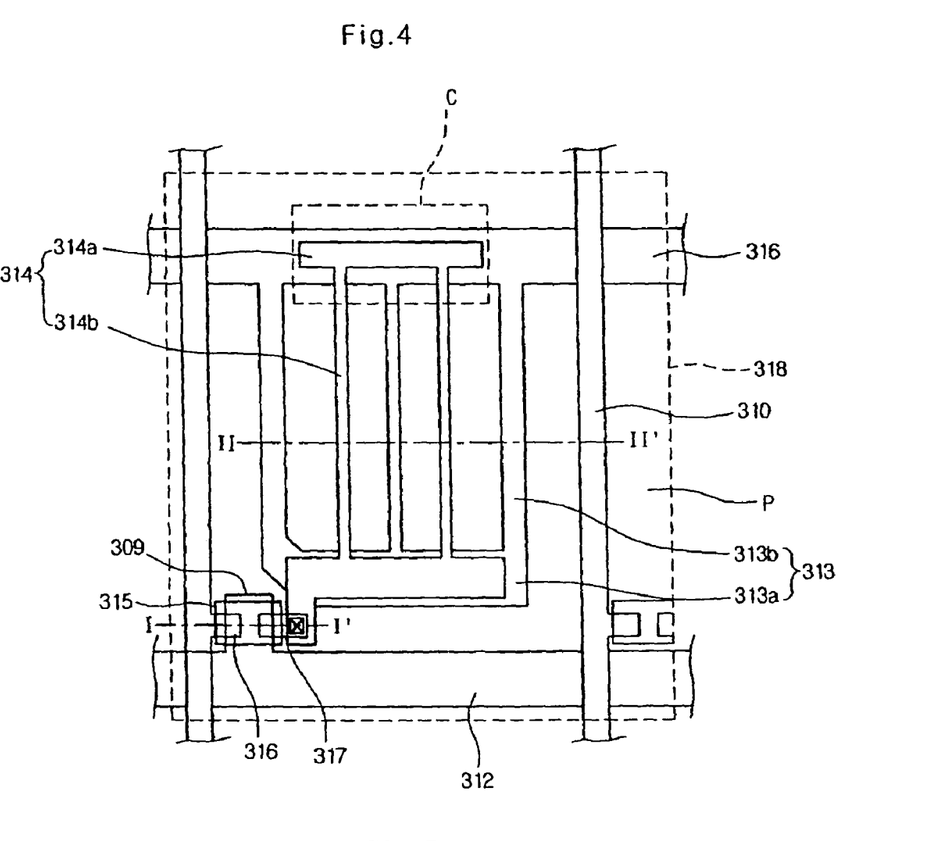
FIG. 4 is a plan view of an array substrate for an IPS LCD according to an embodiment of the present invention.
Figure 5:
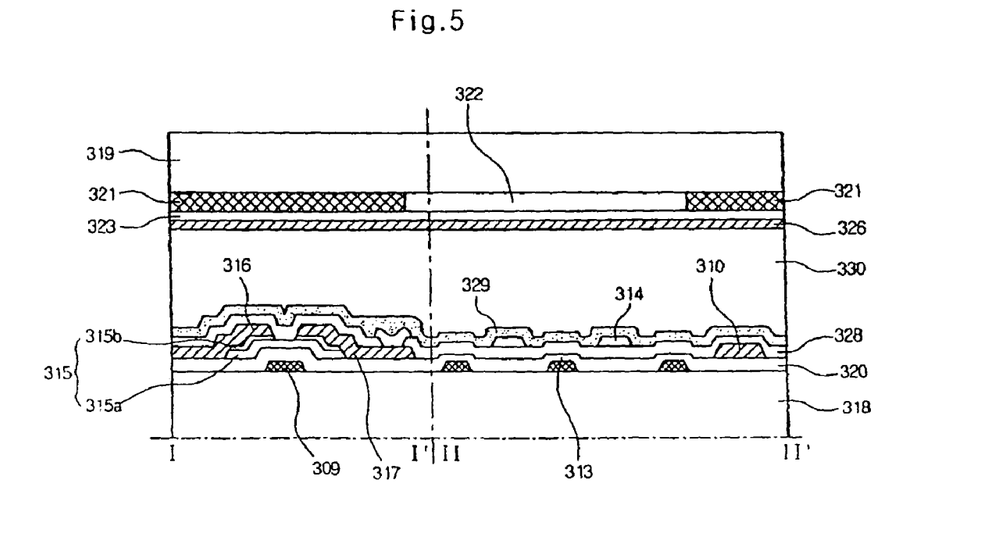
FIG. 5 is a sectional view taken along lines I-I' and II-II' in FIG. 4.

FIG. 4 is a plan view of an array substrate for an IPS LCD according to an embodiment of the present invention, and FIG. 5 is a sectional view taken along lines I-I' and II-II' in FIG. 4.

Referring to FIGS. 4 and 5, a first substrate 318 includes a plurality of gate lines 312 arranged in parallel and spaced apart from one another by a predetermined distance, a plurality of common lines 311 arranged in parallel near the gate lines 312, and a plurality of data lines 310 arranged to cross the gate lines 312 to thus define pixel regions P.

A thin film transistor (TFT) T is disposed at a crossing of the gate line 312 and the data line 310. The TFT T includes a gate electrode 309, a semiconductor layer 315, a source electrode 316, and a drain electrode 317. The source electrode 316 is connected to the data line 310, and the gate electrode 309 is connected to the gate line 312.

A channel formed between the source and drain electrodes 316 and 317 may have any of a variety of shapes, including a straight shape, a U-shape, etc.

A pixel electrode 314 and a common electrode 313 are formed on the pixel region P.

The pixel electrode 314 includes a plurality of vertical portions 314b and a first horizontal portion 314a. The vertical portions 314b extend from a second horizontal portion 314c that contacts the drain electrode 317, are substantially in parallel to the data line 310, and are spaced apart from one another by a predetermined distance. The first horizontal portion 314a is commonly connected to the vertical portions 314b.

The common electrode 313 includes a plurality of vertical portions 313b and a horizontal portion 313a. The vertical portions 313b extend vertically downward (in the context of the figure) from the common line 311 and are arranged substantially in parallel to and alternately with the vertical portions 314b. The horizontal portion 313a is commonly connected to the vertical portions 313b. The pixel electrode 314 is connected to the drain electrode 317, and the vertical portions 313b of the common electrode 313 are arranged in parallel to the vertical portions 314b of the pixel electrode 314 and connected to the common line 311.

The horizontal portion 314a of the pixel electrode 314 is formed on a portion of the common line 311, with a gate insulating layer 320 interposed therebetween, thereby forming a storage capacitor C.

The vertical portion 313b of the common electrode 313 and the vertical portion 314b of the pixel electrode 314 may be formed in a zigzag shape having at least one bent portion. Also, the data line 310 may be formed in a zigzag shape substantially in parallel to the common electrode 313 and the pixel electrode 314.

Referring to FIG. 5, first and second substrates 318 and 319 are attached together, and liquid crystal is provided in a space between the substrates 318 and 319 to form a liquid crystal layer 330 therebetween. A metal material is deposited on the first substrate 318 and the resulting structure is patterned, thereby forming a plurality of gate lines and a gate electrode 309 branching out from the gate line to be positioned corresponding to a TFT.

A gate insulating layer 320 is formed on the entire surface of the first substrate 318 to cover the gate electrode 309, and a semiconductor layer 315 including an active layer 315a and ohmic contact layer 315b is formed on the gate insulating layer 320.

A plurality of data lines 310 are formed on the gate insulating layer 320 in such a way to form a matrix structure together with the gate lines.

At this time, source and drain electrodes 316 and 317 of the TFT may be formed simultaneously with the data lines 310.

A common line 311 is formed substantially parallel to the gate lines.

A passivation layer 328 is formed on the entire surface of the first substrate 318 to cover the resulting structure.

A pixel electrode 314 is electrically connected to the drain electrode 317 and to be substantially parallel to the data lines 310.

A first alignment layer 329 is formed on the entire surface of the first substrate 318 to cover the resulting structure.

Meanwhile, black matrix 321 for preventing a light leakage is formed on the second substrate 319, and R/G/B (red/green/blue) color filter layers 322 are formed between the black matrices 321.

An overcoat layer 323 is formed on the color filter layers 322 in such a way to planarize the resulting surface and to protect the color filter layers 322.

A second alignment layer 326 is formed on the overcoat layer 323.

Figure 6:
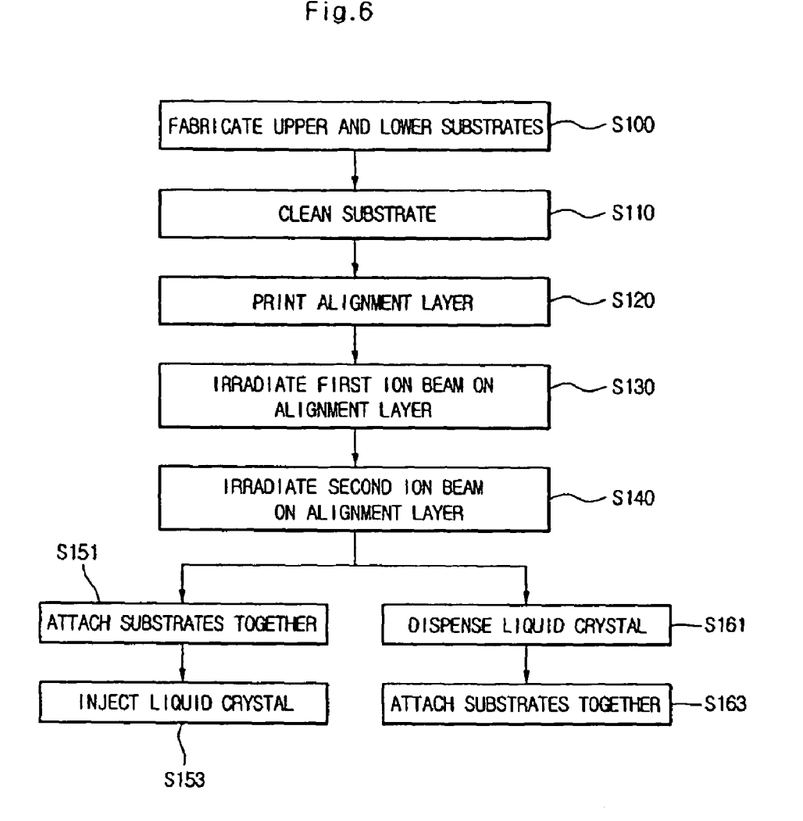
FIG. 6 is a flowchart illustrating a method of fabricating an IPS LCD according to an embodiment of the present invention.

FIG. 6 is a flowchart illustrating a method of fabricating an IPS LCD according to an embodiment of the present invention.

Referring to FIGS. 5 and 6, upper and lower substrates are fabricated in Step S100.

In Step S110, a cleaning process is performed to remove foreign substance on the substrates. In Step S120, by using an alignment layer printing device, polyimide (PI) is printed on the substrate to form an alignment layer.

Thereafter, an alignment layer curing process is performed to dry and harden a solvent of the printed PI.

In Step S130, first ion beams are irradiated on the fired surface of the alignment layer using an ion beam irradiating device. The first ion beams are irradiated in a first direction at a predetermined angle to the substrate. In Step S140, second ion beams are irradiated on the substrate. The second ion beams are irradiated in a second direction different from the first direction.

The above irradiation steps serve to perform an alignment process on the alignment layer. For example, the first and second directions may be symmetrical or asymmetrical with respect to a line perpendicular to the substrate. For instance, when the first ion beams are irradiated at a 45°-angle to the substrate, the second ion beams may be irradiated at 135°-angle to the substrate. Meanwhile, the second ion beams may be irradiated with a mask disposed on the substrate, so that they cannot be irradiated on a surface portion on which the first beams have been irradiated.

In addition, the first ion beams may be irradiated in the first direction, with a mask disposed on the substrate to perform an alignment process with respect to a line region or a stepped portion of an electrode region, and then second ion beams may be irradiated in the second direction to perform an alignment process with respect to the entire surface of the substrate.

After Step S140, the upper and lower substrates are attached together, and/or a liquid crystal layer is formed in a space between the attached substrates.

In other words, after the alignment at step S140, the upper and lower substrates may be attached together S151. In detail, in one embodiment of the present invention, a seal pattern serving as an adhesive may be first formed at an edge of the upper substrate, excepting a liquid crystal injection hole, and spacers are dispersed on the lower substrate. Thereafter, the upper and lower substrates are attached together at an accuracy of several micrometers for preventing light leakage. Thereafter, the attached substrates are cut into unit cells having a predetermined size. The cell cutting process includes a scribe operation of forming a line on the upper and lower substrates, and a break operation of breaking the attached substrates into unit cells by applying an impact against the scribed line. Finally, liquid crystal is injected through the injection hole into a space between the cut substrates and the injection hole is sealed S153, thereby completing the desired LCD.

Alternatively, in another aspect of the invention, the liquid crystal layer may be formed through a liquid crystal dispensing process. In detail, after the forming of the alignment layer at S140, liquid crystal is dispensed on the substrate S161, the seal pattern is formed, and then the spacers are dispersed. Thereafter, the upper and lower substrates are attached together S163, and the attached substrates are cut into unit cells, thereby completing the LCD.

As described above, the first and second ion beam irradiating processes are performed to substantially completely align the alignment layer with respect to the entire region of the substrate.

The irradiated direction of the second ion beam may be symmetrical to that of the first ion beam with respect to a line substantially perpendicular to the substrate.

For example, when the irradiated direction of the first ion beam is inclined at an angle "θ" to the substrate, the irradiated direction of the second ion beam may be inclined at an about opposite angle "−θ" to the substrate.

Figure 7A:
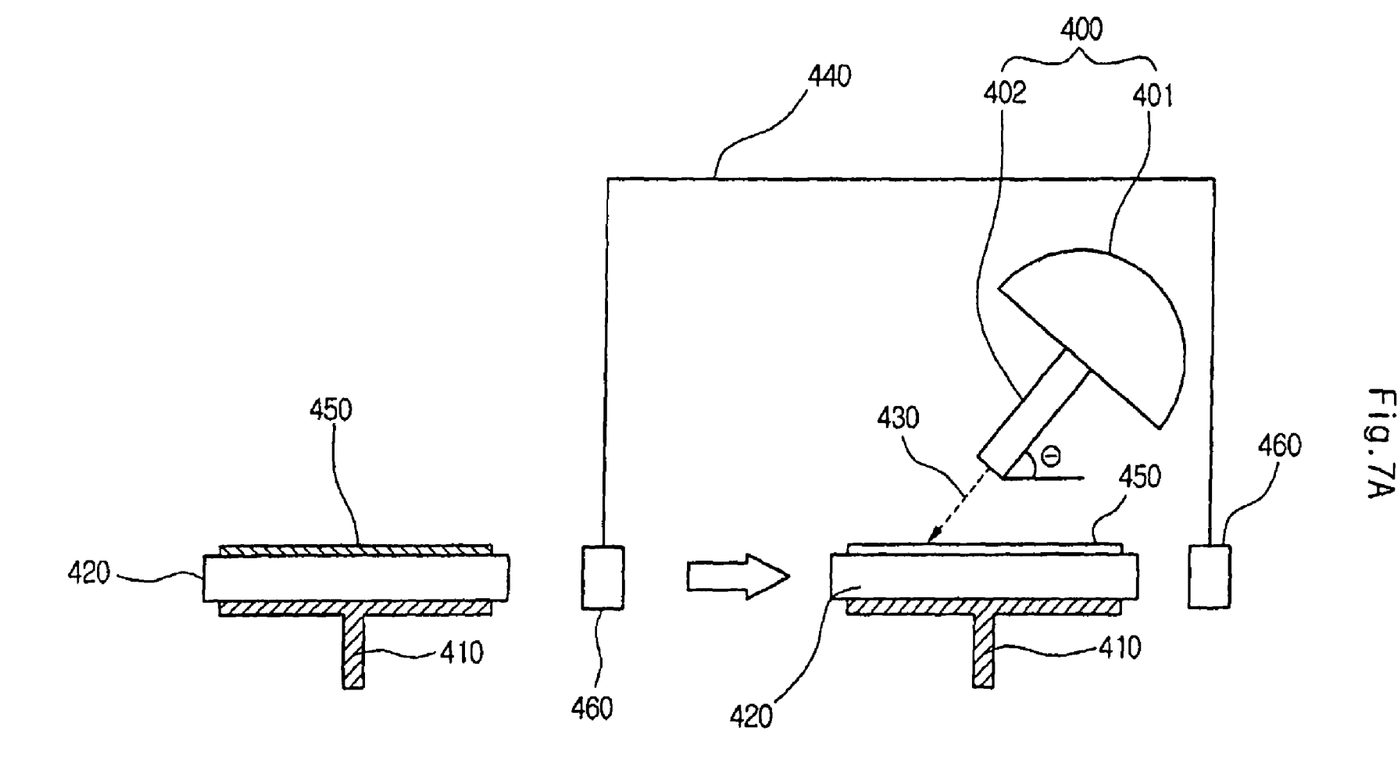
FIG. 7A is a view illustrating a first ion beam irradiating process according to an embodiment of the present invention.
Figure 7B:
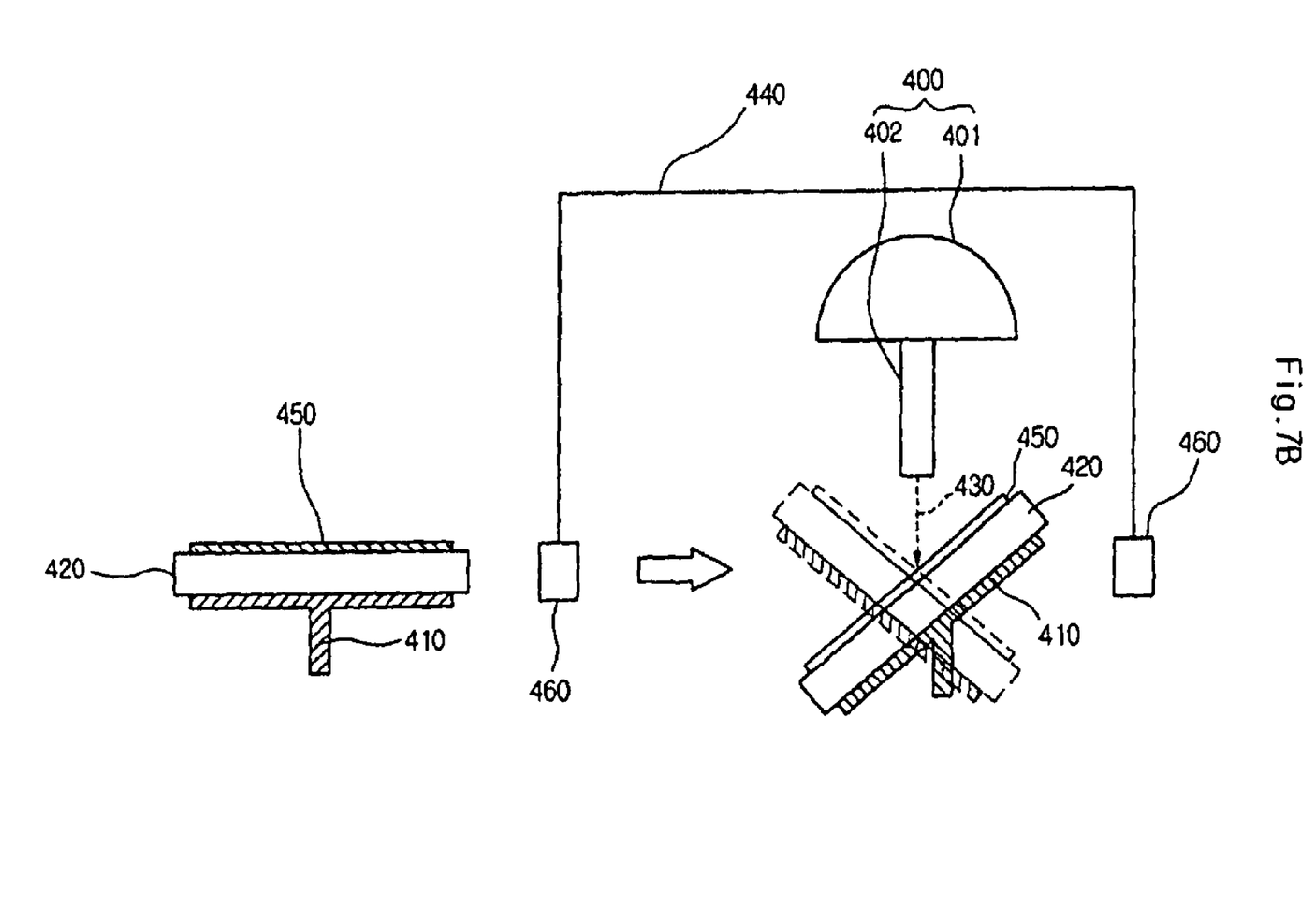
FIG. 7B is a view illustrating a first ion beam irradiating process according to another embodiment of the present invention.
Figure 7C:
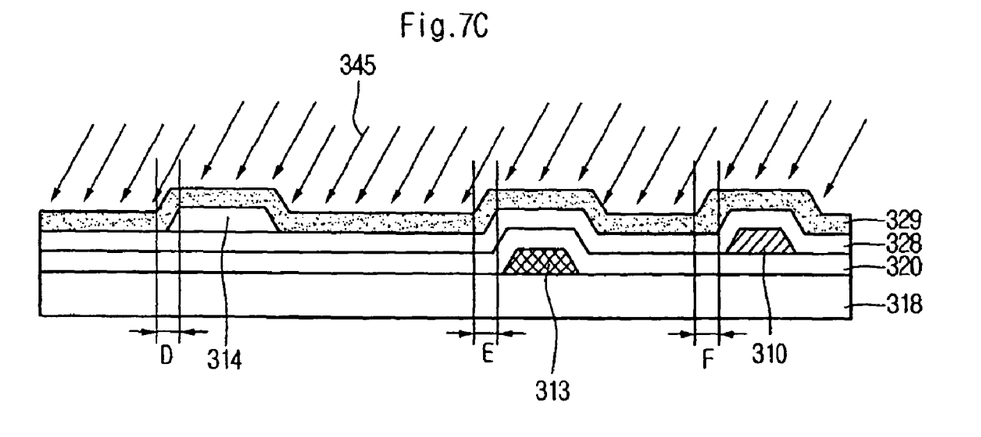
FIG. 7C is a sectional view of a substrate that is aligned through the first ion beam irradiating process in FIG. 7A or FIG. 7B.
Figure 8A:
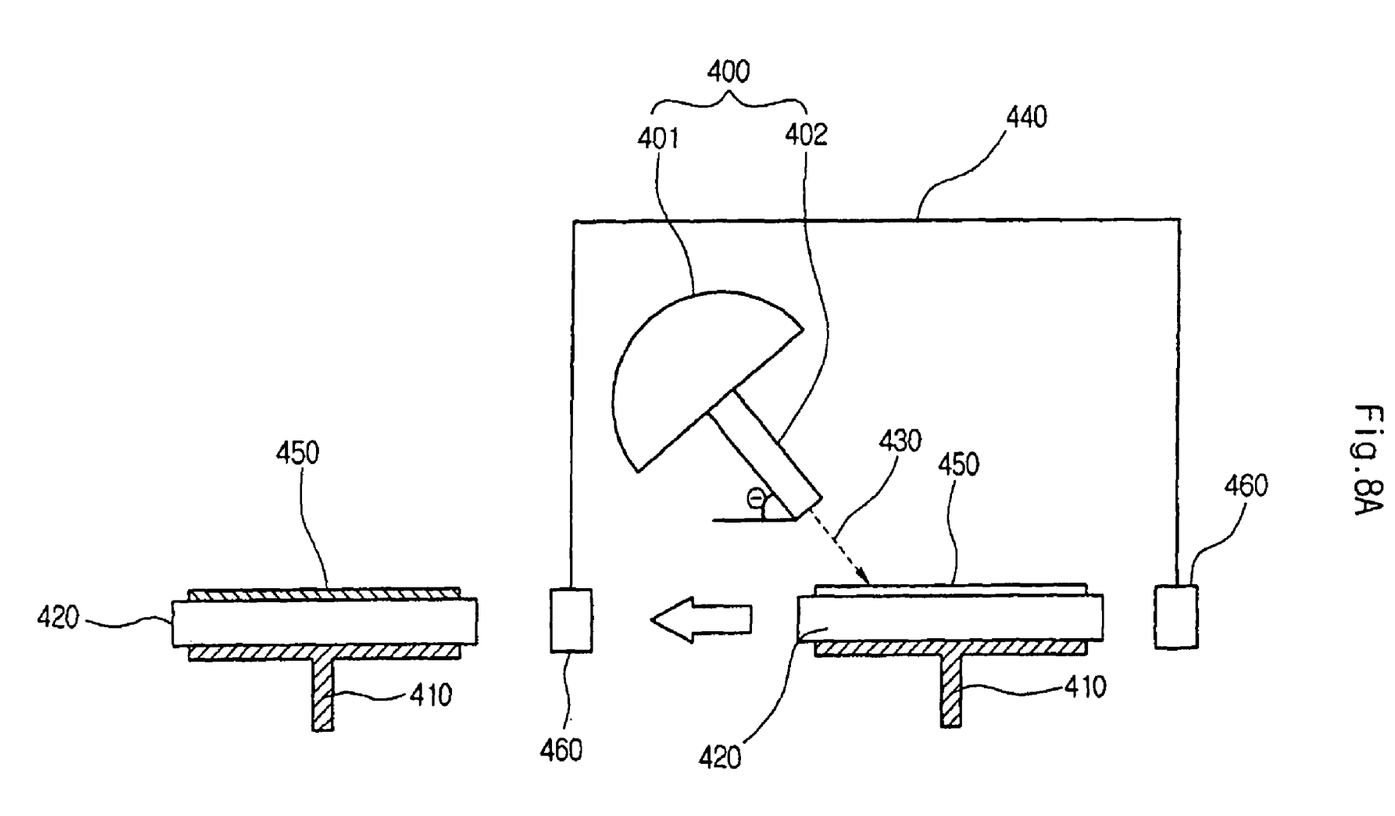
FIG. 8A is a view illustrating a second ion beam irradiating process according to the first embodiment of the present invention.
Figure 8B:
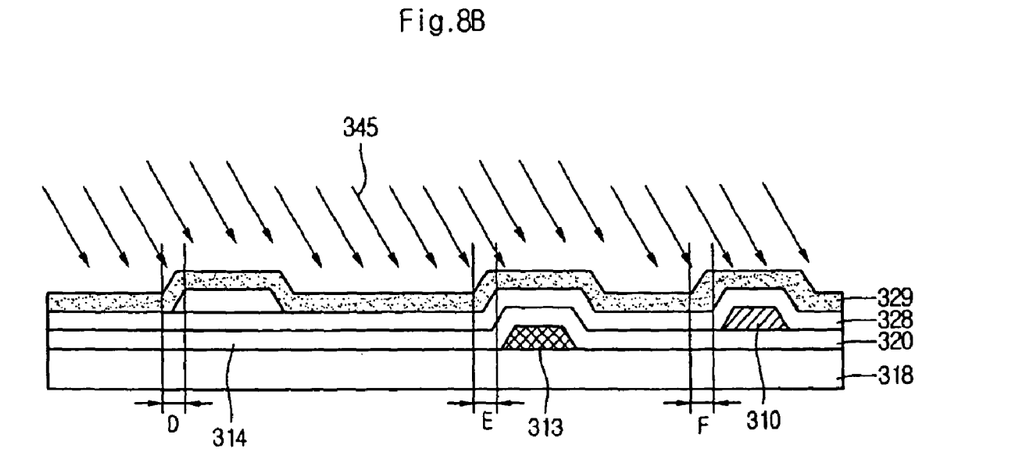
FIG. 8B is a sectional view of the substrate that is aligned through the second ion beam irradiating process in FIG. 8A.
Figure 9A:
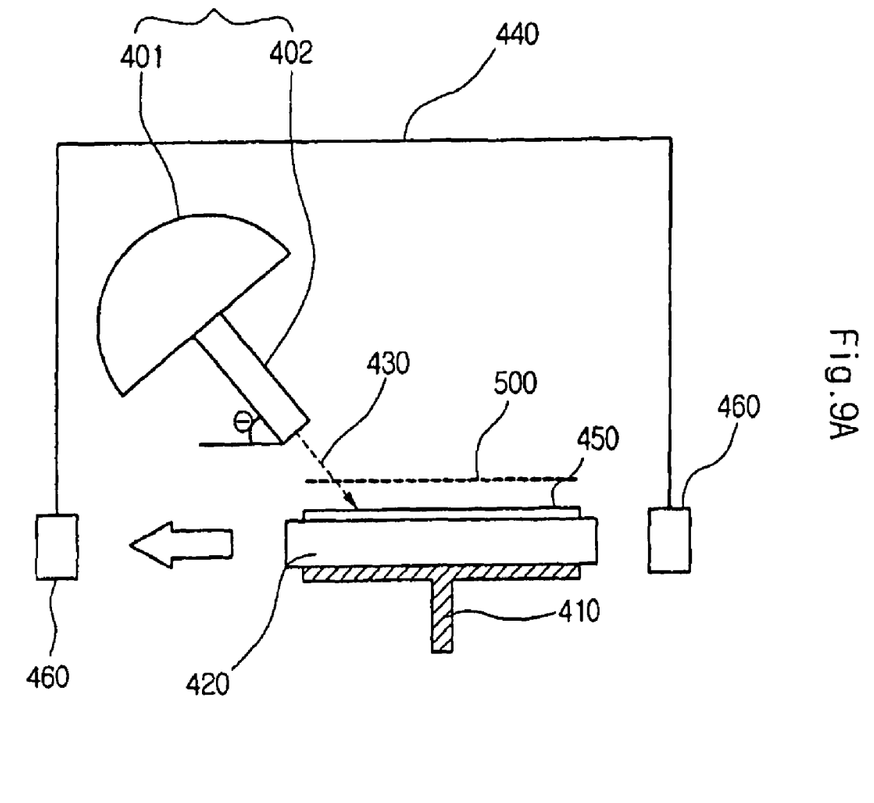
FIG. 9A is a view illustrating a second ion beam irradiating process according to a second embodiment of the present invention.
Figure 9B:
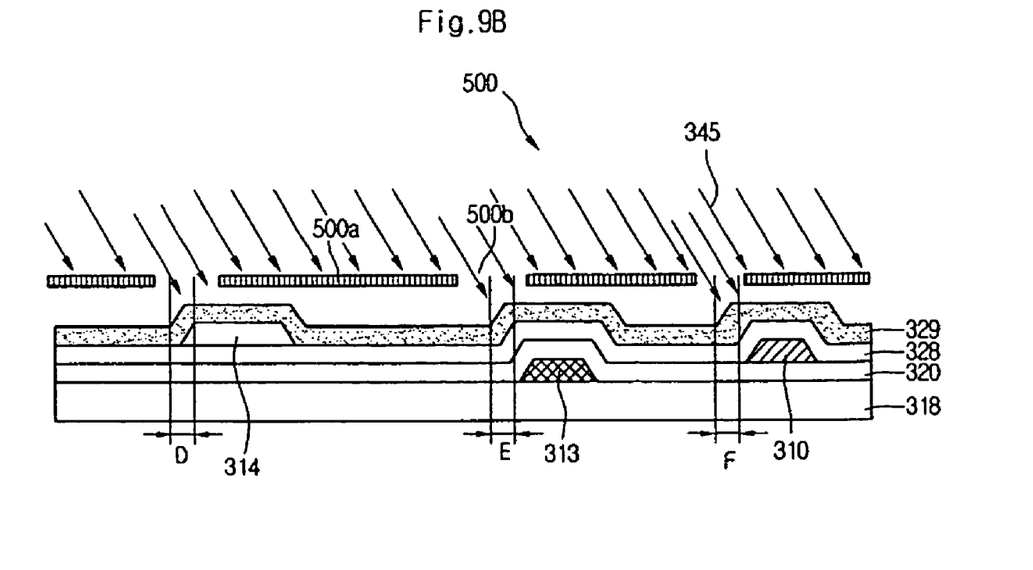
FIG. 9B is a sectional view of the substrate that is aligned through the second ion beam irradiating process in FIG. 9A.

FIGS. 7 through 9 are views illustrating an alignment process on an alignment layer in the LCD fabricating method according to the present invention.

FIG. 7A is a view illustrating a first ion beam irradiating process according to a first embodiment of the present invention.

Referring to FIG. 7A, as a substrate 420 is moved in a predetermined direction in an ion beam irradiating device, an ion beam 430 is irradiated on the entire surface of the substrate 420 (the first ion beam irradiating process).

The ion beam irradiating device includes an ion beam source 400 for ionizing an injected gas into ions, accelerating the ions and irradiating the accelerated ions onto the substrate 420, a vacuum chamber 440 for straightly guiding an ion beam 430 from the ion beam source 400 to the substrate 420, a stage 410 for fixedly mounting the substrate 420 thereon, and a valve 460 for moving the stage 410 in a predetermined direction (for example, a horizontal direction) and discharging gas whenever the ion beam irradiating operation is completed.

The ion beam source 400 includes a plasma forming unit 401 for dividing the injected gas into ions and electrons to form plasma, and an ion gun 402 for accelerating the ion beam 430 and emitting the accelerated ion beam onto the substrate 420.

Although not shown in FIG. 7A, a shutter for adjusting a duration during which the ion beam 430 is irradiated on the substrate 420, and a mask for adjusting the irradiated amount of the ion beam 430 may be separately provided between the ion beam source 400 and the substrate 420.

An alignment layer 450 is deposited on the substrate 420. The alignment layer 450 may be formed of polyimide, $SiO_2$, SiC, $Si_3N_4$, $Al_2O_3$, $CeO_2$, $SnO_2$, glass, $ZnTiO_2$, diamond-like Carbon (DLC), or the like.

The ion beam source 400 generates the ion beam 430. In detail, an injected gas is ionized by a voltage difference between a cathode and an anode to generate plasma including ions and electrons, ions are extracted from the generated plasma by an extracting electrode, and the extracted ions are emitted through the ion gun 402 in the form of the ion beam 430.

The emitted ion beam 430 is accelerated by an electric field and is then irradiated onto the substrate 420 at a predetermined angle θ to the substrate 420.

For this purpose, the ion gun 402 is inclined at the predetermined angle-to the substrate 420 fixedly mounted on the stage 410. Alternatively, as illustrated in FIG. 7B, the stage 410 may be inclined with respect to ion gun 402. Furthermore, the stage 410 may be movable to allow the incline to be adjusted.

Since the stage 410 fixedly mounting the substrate 420 thereon is moved in a predetermined direction at a predetermined speed, the ion beam 430 can be irradiated on the entire surface of the alignment layer 450 formed on the substrate 420.

Accordingly, the irradiated ion beam 430 makes it possible to form a desired alignment direction and a pretilt angle of the alignment layer 450.

The alignment layer is formed of an organic material such as polyimide. The organic material includes a main chain and a side chain.

The main chain serves to align liquid crystal molecules in a predetermined direction, and the side chain serves to form the pretilt angle.

In particular, a specific portion of the main chain is disconnected by the irradiated ion beam 430, thereby aligning the liquid crystal molecules.

The emitted ion beam 430 is irradiated onto the alignment layer 450 at a predetermined angle θ to the alignment layer 450, thereby forming the pretilt angle of the liquid crystal molecules.

The first ion beam irradiating process will be described in detail below.

The first ion beam irradiating process includes an operation of loading the substrate 420 having the alignment layer 450 formed thereon onto the stage 410, an operation of moving the stage 410 into the vacuum chamber 440 and irradiating the ion beam 430 onto the substrate 420 mounted on the stage 410, and an operation of moving the stage 410 outside the vacuum chamber 440 after the ion beam 430 is completely irradiated on the entire surface of the alignment layer 450 formed on the substrate 420.

In detail, the substrate 420 is loaded onto the stage 410 before the stage 410 is moved into the vacuum chamber 440. Thereafter, when the valve 460 is opened, the stage 410 is moved into the vacuum chamber 440. Thereafter, the stage 410 is moved within the vacuum chamber 440 in a predetermined direction at a predetermined speed. At this time, the ion beam 430 is irradiated through the bar-type ion gun 402, which is inclined at a predetermined angle θ with respect to the substrate 420, onto the substrate 420. Accordingly, the ion beam 430 is irradiated onto the entire surface of the alignment layer 450 formed on the substrate 420, thereby forming the alignment direction and pretilt angle of the liquid crystal molecules. Alternatively, the ion beam may be scanned over the alignment on the substrate rather than being irradiated in a one time shot.

FIG. 7C is a sectional view of a substrate that is aligned through the first ion beam irradiating process in FIG. 7A.

Referring to FIG. 7B, a common electrode 313 is formed on a substrate 318, and a gate insulating layer 320 and a passivation layer 328 are formed on the common electrode 313.

A data line 310 is formed between the gate insulating layer 320 and the passivation layer 328.

A pixel electrode 314 is formed on the passivation layer 328. The pixel electrode 314 is not overlapped with the common electrode 313. An alignment layer 329 (450 in FIG. 7A) is formed on the passivation layer 328 and the pixel electrode 314.

In the alignment process of the alignment layer 329 using the ion beam 345 (430 in FIG. 7A), a step difference is formed in the common electrode 313 and the pixel electrode 314. Accordingly, due to the taper angle of the step difference, the ion beam 345 (430 in FIG. 7A) irradiated onto the alignment layer 329 does not reach regions D and E.

Also, a step difference is formed in the data line 310. Accordingly, due to the taper angle of the step difference, the ion beam 345 irradiated onto the alignment layer 329 does not reach a region F.

Accordingly, after the first ion beam irradiating process, a second ion beam irradiating process is performed to align the regions D, E and F that fail to be aligned.

FIG. 8A is a view illustrating a second ion beam irradiating process according to the first embodiment of the present invention, and FIG. 8B is a sectional view of the substrate aligned through the second ion beam irradiating process in FIG. 8A.

Referring to FIGS. 8A and 8B, as a substrate 420 is moved in a predetermined direction in an ion beam irradiating device, an ion beam 430 is irradiated on the entire surface of the substrate 420 (the second ion beam irradiating process).

The ion beam irradiating device and the substrate 420 are the same as those illustrated in FIGS. 7A, 7B and 7C, and thus a detailed description thereof will be omitted for conciseness.

An ion gun 402 is inclined such that the irradiated direction of the second ion beam may be substantially symmetrical to that of the first ion beam with respect to a line perpendicular to the substrate.

For example, when the irradiated direction of the first ion beam is inclined at an angle "θ" to the substrate, the irradiated direction of the second ion beam may be inclined at an about opposite angle "−θ" to the substrate.

Accordingly, the second ion beam irradiating process makes it possible to align the regions D, E and F that fail to be aligned during the first ion beam irradiating process.

Specifically, the ion beam 430 (345 in FIG. 8B) is irradiated onto the alignment layer 450 at a predetermined angle θ to the alignment layer 450, thereby forming the pretilt angle of the liquid crystal molecules.

At this time, the ion beam 345 are irradiated on the regions D, E and F that fail to be aligned during the first ion beam irradiating process, thereby making it possible to uniformly align the entire surface of the alignment layer 329 (450 in FIG. 8A).

After completion of the second ion beam irradiating process, the valve 460 is opened and then the stage 410 is moved outside the vacuum chamber 440.

The uniform alignment of the alignment layer makes it possible to prevent light leakage and to thus enhance an aperture ratio.

FIG. 9A is a view illustrating a second ion beam irradiating process according to a second embodiment of the present invention, and FIG. 9B is a sectional view of the substrate that is aligned through the second ion beam irradiating process in FIG. 9A.

Referring to FIGS. 9A and 9B, as a substrate 420 is moved in a predetermined direction in an ion beam irradiating device, an ion beam 430 (345 in FIG. 9B) is irradiated on the entire surface of the substrate 420 (the second ion beam irradiating process).

The ion beam irradiating device and the substrate are the same as those illustrated in FIGS. 7A and 7B and thus a detailed description thereof will be omitted for conciseness.

An ion gun 402 is inclined such that the irradiated direction of the second ion beam may be symmetrical to that of the first ion beam with respect to a line perpendicular to the substrate.

Also, a mask 500 is disposed between the substrate 420 and the ion gun 402.

The mask 500 includes a blocking portion 500a for blocking the ion beam 345, and a transmitting portion 500b for transmitting the ion beam 345. The ion beam 345 penetrates the transmitting portion 500b and is irradiated on the regions D, E and F of the substrate 318, thereby aligning the regions D, E and F.

The second ion beam is irradiated in a second direction different from the first direction.

For example, the first and second directions may be symmetrical or asymmetrical with respect to a line perpendicular to the substrate. For instance, when the first ion beam is irradiated at a 45°-angle to the substrate, the second ion beam may be irradiated at 135°-angle to the substrate.

Accordingly, the second ion beam irradiating process makes it possible to align the regions D, E and F that fail to be aligned during the first ion beam irradiating process.

Specifically, the ion beam 430 (345 in FIG. 8B) is irradiated onto the alignment layer 450 at a predetermined angle θ to the alignment layer 450, thereby forming the pretilt angle of the liquid crystal molecules.

At this time, the ion beam 345 are irradiated on the regions D, E and F that fail to be aligned during the first ion beam irradiating process, thereby making it possible to uniformly align the entire surface of the alignment layer 329 (450 in FIG. 8A).

After completion of the second ion beam irradiating process, the valve 460 is opened and then the stage 410 is moved outside the vacuum chamber 440.

The uniform alignment of the alignment layer makes it possible to prevent light leakage and to thus enhance an aperture ratio. Consequently, an image quality of the LCD can be greatly enhanced.

The stepped portion having the taper angle may be formed at a gate line, a data line, a common electrode, a pixel electrode, a storage electrode, and the like.

The LCD may be not only the IPS LCDs, but also various-mode LCDs, such as a TN LCD, a VA LCD, an OCB LCD, and an ECB LCD, etcan.

The alignment process may be easily performed by irradiating the ion beam onto the passivation or the overcoat layer.

As described above, the first and second ion beam irradiating processes are performed with respect to the alignment layer, resulting in the uniform alignment in the entire surface of the alignment layer. Accordingly, the light leakage can be prevented and thus the image quality and the product reliability can be enhanced.

Also, the black matrix margin can be reduced and the aperture ratio can be enhanced.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method for fabricating an LCD including first and second substrates and a liquid crystal layer between the first and second substrates, comprising:
    forming a data line, a first electrode and a second electrode on the first substrate and arranged in parallel;
    forming a gate line to cross the data line;
    forming an alignment layer on an entire surface of the first substrate, the alignment layer including first and second portions having first and second inclined surfaces respectively produced by step differences of the data line, the first electrode, second electrode and the gate line and third portions having flat surfaces;
    performing a first alignment process on the alignment layer by irradiating a first ion beam through a bar-type ion gun onto the first portions and the third portions of the alignment layer in a first direction inclined at a first predetermined angle to the first substrate; and
    performing a second alignment process on the alignment layer by irradiating a second ion beam through the bar-type ion gun onto the second portions and the third portions of the alignment layer in a second direction inclined at a second predetermined angle to the first substrate, wherein the first and second directions are opposite to each other.

2. The method according to claim 1, further comprising after the second alignment process:
    attaching the first and second substrates together; and
    injecting liquid crystal into a space between the attached first and second substrates to form a liquid crystal layer.

3. The method according to claim 1, further comprising after the second alignment process:
  dispensing liquid crystal on one of the first and second substrates; and
  attaching the first and second substrates together.

4. The method according to claim 1, wherein the first alignment process comprises:
  disposing the first substrate so that the first ion beam from an ion beam irradiation device is irradiated in the first direction; and
  irradiating the first ion beam onto the first substrate in the first direction.

5. The method according to claim 1, wherein the second alignment process comprises:
  disposing the first substrate so that the second ion beam from an ion beam irradiation device is irradiated in the second direction; and
  irradiating the second ion beam onto the first substrate in the second direction.

6. The method according to claim 1, wherein the first and second directions are symmetrical with respect to a line perpendicular to the first substrate.

7. The method according to claim 1, wherein an irradiated angle of the first ion beam is different from an irradiated angle of the second ion beam.

8. The method according to claim 1, wherein the first electrode is a pixel electrode and the second electrode is a common electrode.

9. The method according to claim 1, wherein the first and second electrodes are formed in a bent structure.

10. The method according to claim 1, further comprising:
  forming a black matrix on the second substrate;
  forming a color filter layer on the black matrix;
  forming an overcoat layer on the color filter layer; and
  forming an alignment layer on the overcoat layer.

11. A method for fabricating an LCD including first and second substrates and a liquid crystal layer interposed between the first and second substrates, comprising:
  forming a data line, a first electrode and a second electrode on the first substrate and arranged in parallel;
  forming a gate line to cross the data line;
  forming an alignment layer on the first substrate, the alignment layer including first and second portions having first and second inclined surfaces respectively produced by step differences of the first electrode, the second electrode and the data line and third portions having flat surfaces;
  performing a first alignment process on the alignment layer by irradiating a first ion beam onto the first portions and the third portions of the alignment layer in a first direction inclined at a first predetermined angle to the first substrate, wherein the first ion beam is irradiated in the first direction through a bar-type ion gun to perform the first alignment process with respect to the first substrate;
  disposing a mask including a blocking portion and a transmitting portion which is arranged to correspond to the second portions of the alignment layer over the first substrate; and
  performing a second alignment process on the alignment layer by irradiating a second ion beam onto the second portions of the alignment layer through the transmitting portion of the mask in a second direction inclined at a second predetermined angle to the first substrate, wherein the second ion beam is irradiated in the second direction opposite to the first direction through the bar-type ion gun to perform the second alignment process with respect to the first substrate.

12. The method according to claim 11, further comprising after the second alignment process:
  attaching the first and second substrates together; and
  injecting liquid crystal into a space between the attached first and second substrates to form a liquid crystal layer.

13. The method according to claim 11, further comprising after the second alignment process:
  dispensing liquid crystal on one of the first and second substrates; and
  attaching the first and second substrates together.

14. The method according to claim 11, wherein the first and second directions are symmetrical with respect to a line perpendicular to the first substrate.

15. The method according to claim 11, wherein an irradiated angle of the first ion beam is different from an irradiated angle of the second ion beam.

16. The method according to claim 11, wherein the first electrode is a pixel electrode and the second electrode is a common electrode.

17. The method according to claim 11, wherein the first and second electrodes are formed in a bent structure.

18. The method according to claim 11, further comprising:
  forming a black matrix on the second substrate;
  forming a color filter layer on the black matrix;
  forming an overcoat layer on the color filter layer; and
  forming the alignment layer on the overcoat layer.

19. The method according to claim 1, further comprising:
  forming gate and common lines on the first substrate in a horizontal direction such that the gate and common lines are spaced apart from each other by a predetermined distance;
  forming a data line in a direction crossing the gate line;
  forming a plurality of common electrodes substantially parallel to the data line; and
  forming a plurality of pixel electrodes alternating with the common electrodes.

20. The method according to claim 19, further comprising:
  forming a black matrix on a second substrate facing the first substrate;
  forming a color filter layer on the black matrix;
  forming an overcoat layer on the color filter layer; and
  forming a second alignment layer on the overcoat layer.

21. The method according to claim 19, further comprising after the second alignment process:
  attaching the first and second substrates together; and
  injecting liquid crystal into a space between the attached first and second substrates to form a liquid crystal layer.

22. The method according to claim 19, further comprising after the second alignment process:
  dispensing liquid crystal on one of the first and second substrates; and
  attaching the first and second substrates together.

23. The method according to claim 19, wherein the first direction is different from the second direction.

24. The method according to claim 19, wherein the first and second directions are symmetrical with respect to a line perpendicular to the first substrate.

25. The method according to claim 19, wherein the first and second directions are asymmetrical with respect to a line perpendicular to the first substrate.

26. The method according to claim 19, wherein an irradiated angle of the first ion beam is different from an irradiated angle of the second ion beam.

27. The method according to claim 11, further comprising:
forming gate and common lines on the first substrate in a horizontal direction such that the gate and common lines are spaced apart from each other by a predetermined distance;
forming a data line in a direction crossing the gate line;
forming a plurality of common electrodes substantially parallel to the data line; and
forming a plurality of pixel electrodes alternating with the common electrodes.

28. The method according to claim 19, further comprising:
forming a black matrix on a second substrate facing the first substrate;
forming a color filter layer on the black matrix;
forming an overcoat layer on the color filter layer; and
forming a second alignment layer on the overcoat layer.

29. The method according to claim 11, further comprising after the second alignment process:
attaching the first and second substrates together; and
injecting liquid crystal into a space between the attached first and second substrates to form a liquid crystal layer.

30. The method according to claim 27, further comprising after the second alignment process:
dispensing liquid crystal on one of the first and second substrates; and
attaching the first and second substrates together.

31. The method according to claim 11, wherein the first and second directions are symmetrical with respect to a line perpendicular to the first substrate.

32. The method according to claim 27, wherein the first and second directions are asymmetrical with respect to a line perpendicular to the first substrate.

33. The method according to claim 11, wherein an irradiated angle of the first ion beam is different from an irradiated angle of the second ion beam.

34. A method for fabricating an LCD including first and second substrates and a liquid crystal layer interposed between the first and second substrates, comprising:
forming a data line, a first electrode and a second electrode on the first substrate and arranged in parallel;
forming a gate line to cross the data line;
forming an alignment layer on the first substrate, the alignment layer including first and second portions having first and second inclined surfaces respectively produced by step differences of the first electrode, the second electrode and the data line and third portions having flat surfaces;
disposing a mask including a blocking portion and a transmitting portion which is arranged to correspond to the first portions of the alignment layer over the first substrate;
performing a first alignment process on the alignment layer by irradiating a first ion beam onto the first portions of the alignment layer through the transmitting portion of the mask in a first direction inclined at a first predetermined angle to the first substrate, wherein the first ion beam is irradiated in the first direction through a bar-type ion gun to perform the first alignment process with respect to the first substrate;
removing the mask; and
performing a second alignment process on the alignment layer by irradiating a second ion beam onto the second portions and the third portions of the alignment layer in a second direction inclined at a second predetermined angle to the first substrate, wherein the second ion beam is irradiated in the second direction opposite to the first direction through the bar-type ion gun to perform the second alignment process with respect to the first substrate.

35. The method according to claim 34, further comprising after the second alignment process:
attaching the first and second substrates together; and
injecting liquid crystal into a space between the attached first and second substrates to form a liquid crystal layer.

36. The method according to claim 34, further comprising after the second alignment process:
dispensing liquid crystal on one of the first and second substrates; and
attaching the first and second substrates together.

37. The method according to claim 34, wherein the first and second directions are symmetrical with respect to a line perpendicular to the first substrate.

38. The method according to claim 34, wherein an irradiated angle of the first ion beam is different from an irradiated angle of the second ion beam.

39. The method according to claim 34, further comprising:
forming a black matrix on the second substrate;
forming a color filter layer on the black matrix;
forming an overcoat layer on the color filter layer; and
forming the alignment layer on the overcoat layer.

40. The method according to claim 34, further comprising:
forming gate and common lines on the first substrate in a horizontal direction such that the gate and common lines are spaced apart from each other by a predetermined distance;
forming a data line in a direction crossing the gate line;
forming a plurality of common electrodes substantially parallel to the data line; and
forming a plurality of pixel electrodes alternating with the common electrodes.

* * * * *